Sept. 21, 1965  K. W. KEAN  3,207,458
AUTOMATIC SYSTEM FOR AERODYNAMIC TRIM
Original Filed Feb. 26, 1962
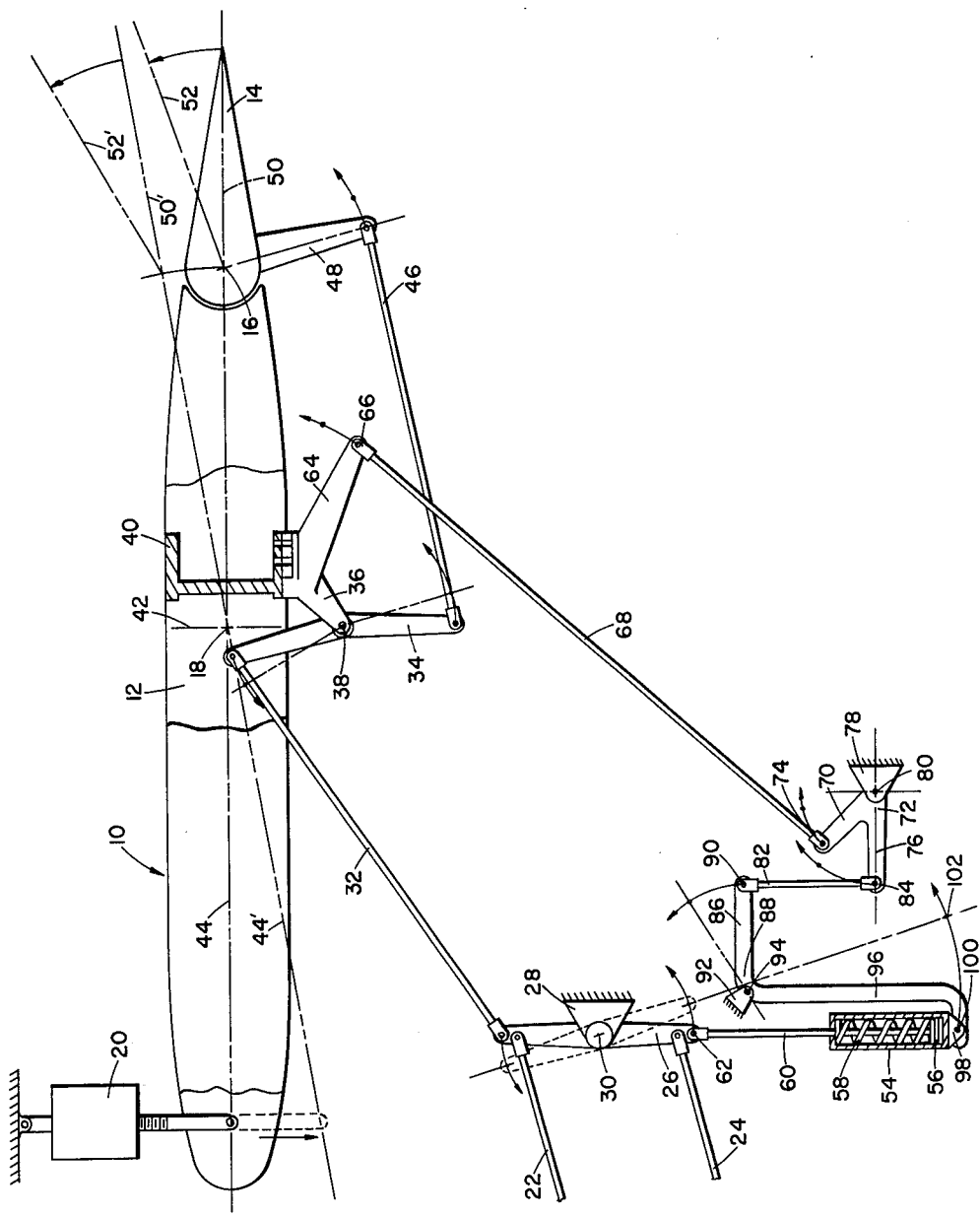
INVENTOR.
KEITH W. KEAN
BY
ATTORNEY Patented Sept. 21, 1965

3,207,458
AUTOMATIC SYSTEM FOR AERODYNAMIC
TRIM
Keith W. Kean, Torrance, Calif., assignor to
North American Aviation, Inc.
Continuation of application Ser. No. 175,713, Feb. 26,
1962. This application Nov. 3, 1964, Ser. No. 410,822
6 Claims. (Cl. 244—87)

This is a continuation of application Serial No. 175,713 filed February 26, 1962.

This invention relates to control systems for vehicles moving through fluid media and particularly to improved means for aerodynamically trimming aerial vehicles automatically about a pitch axis during vehicle flight.

The teachings disclosed herein may be applied to diverse control systems and vehicles, but are especially applicable to aircraft wherein operational characteristics, performance reliability, ease of maintenance and lightness of weight in control systems are of signal importance. Therefore, the invention in this case will be described for the sake of illustration as applied to vehicles of the stated type. It will be understood that the scope of the inventive concept is in no sense limited by any of the specific details used to explain the invention except as determined by reference to the appended claims.

In conventional aircraft, rotatable control surfaces such as elevators are pivotally mounted by hinges on relatively stationary stabilizer surfaces whereby the combination of both stated components comprises an airfoil. Movement of the elevator to deflect an airstream moving over the same causes the reaction force to apply a moment about the aerodynamic center of the vehicle to effect pitch changes about the stated center such as required to control the direction of flight. When the location of the vehicle center of gravity with respect to the aerodynamic center produces an undesirable pitching moment for any reason, correct aerodynamic balance may be restored by positioning the elevators to apply a slight and continuous deflection of airflow in the direction necessary to result in a moment counterbalancing the one which originally produced the stated condition of unbalance.

Since elevator movement is normally accomplished by pilot manipulation of cockpit controls, it is desirable to avoid continuous application of force to such controls for the purpose of maintaining aerodynamic balance. Therefore, it is conventional practice to provide means whereby the normally stationary portion of the horizontal airfoils in aircraft, commonly known as the stabilizer surface, may be adjustably positioned in an attitude of slight angularity with respect to the direction of airflow around the surface, thus applying a continuous and constant pitching moment for the same reason that angular movement of the elevator in various amounts applies variable pitching moments. The constant and continuous moment described above is commonly known as the trim since it functions to trim the force effects on the air vehicle about its aerodynamic center with respect to pitching attitude. Where relatively large trim force is required, as in the case of aircraft having wide ranging variations in center of gravity location during flight due to emptying of fuel tanks or other factors, considerable displacement of the horizontal stabilizer may be necessary in order to produce such force. However, excessive displacement of the stabilizer surface to provide trim force in the stated manner is accompanied by increased drag which can be a significantly adverse factor in aircraft performance. Moreover, when a relatively large range of movement is involved in positioning the stabilizer between its upper and lower limits of travel to accommodate every possible trim condition, the actuator which causes such movement may be required to have a relatively long work stroke which often increases the size of such units or complicates the linkage connected therewith, either of these effects being objectionable from the standpoints of size, weight, cost, and difficulty of maintenance.

Accordingly, it is a principal object of this invention to provide improved means for applying aerodynamic trim forces in an aircraft.

It is a further object to provide means as stated above characterized by reduced stroke requirements in the actuator used for moving an airfoil surface to produce aerodynamic trim forces.

It is another object in this case to provide means as stated above in which displacement of a horizontal stabilizer to provide trim force in an aerial vehicle automatically produces displacement of a control surface hingeably mounted on such stabilizer to augment such trim force.

It is another object to provide means as described in the foregoing object in which the amount of control surface displacement resulting from each increment of stabilizer displacement is adjustably variable by programming linkage.

It is an additional object in this case to provide means as described in the foregoing object in which the stated linkage includes resilient means for providing force in the control system tending to resist control forces applied by the pilot in moving the stated control surface.

Other objects and advantages of the instant invention will become apparent upon a close reading of the following detailed desecription of an illustrative embodiment of the invention, reference being had to the accompanying drawing showing a general schematic view of such embodiment.

Referring to the drawing it may be seen that the inventive concept in this case is applicable to fin like structure such as airfoil 10 which may comprise a normally stationary main portion 12 and a movable control portion 14 hingeably mounted on portion 12 for rotational movement about an axis 16. Illustratively, normally stationary portion 12 may comprise a horizontal stabilizer such as used in the tail section of an aircraft, and movable portion 14 may comprise an elevator mounted on the trailing portion of the stabilizer. In accordance with the conventional practice described above, stabilizer 12 may be mounted for rotation about a pivoting axis 18 in response to operation of suitable means such as actuator 20. Actuator 20 may comprise an electric motor driven jack screw connected to raise or lower the leading edge of stabilizer 12 whereby pivoting of the stabilizer about axis 18 adjustably positions the same to deflect airflow whereby trim force is produced to stabilize the vehicle upon which stabilizer 12 is mounted. Alternatively, actuator 20 may be hydraulic or pneumatic in operation. The amount of trim force produced by rotational adjustment of stabilizer 12 will vary depending upon the angularity thereof in respect to the normal direction of airflow over the stated surface, and the stabilizer is normally stationary in the sense that its angularity does not change after initial adjustment.

Movable portion 14 functions to control the attitude or direction of flight of the vehicle upon which airfoil 10 is mounted. Thus, if movable portion 14 is a control surface such as an elevator, the direction and amount of its rotation about axis 16 will depend upon the desired rate and direction of change of the vehicle position about a lateral axis therethrough known as the pitch axis. Movement of control portion 14 in response to pilot operated controls or automatic guidance mechanism is accomplished through appropriate force transmitting means such as control cables 22 and 24 connected to a rockable member such as lever 26 at either extremity thereof.

Lever 26 is pivotally supported by suitable mounting means such as bracket 28 affixed to relatively stationary vehicle structure, whereby lever 26 rocks about an axis of rotation 30. Connection means in the form of a rigid link 32 extends between lever 26 and a second rockable member in the form of pivotal arm or bellcrank 34. Bellcrank 34 is pivotally supported by suitable mounting means such as bracket 36 whereby the bellcrank rocks about an axis of rotation 38. Bracket 36 is affixed to an appropriate structural element of normally stationary portion 12 such as spar 40. Illustratively, the size and arrangement of parts may be operatively related within the system whereby a line 42 connecting axis 38 with axis 18 is normal to the center axis 44 of portions 12 and 14 which are aligned in the substantially horizontal attitude shown in the drawing and which may be termed the aerodynamically neutral position wherein airflow generally parallel to centerline 44 is deflected neither upwardly nor downwardly by either portion 12 or portion 14.

At the extremity of bellcrank 34 opposite from the attachment of link 32 therewith, other connection means in the form of rigid link 46 is attached to the bellcrank. Link 46 is further connected to a force arm or horn 48 rigidly secured to movable control portion 14 of airfoil 10. Thus, it will be understood that input control force applied to lever 26 in response to manipulation of cockpit controls by the pilot or in response to automatic flight control mechanism will rotate bellcrank 26 normally through a small arc whereby link 32, bellcrank 34, and link 46 will apply force to horn 48 causing rotation of control portion 14 through an arc such as indicated by comparison of lines 50 and 52. Lines 50 and 52 comprise two positions of the center plane through portion 14, and represent an angle of deflection of portion 14 with respect to portion 12.

Means are further provided in the control system disclosed herein to automatically resist control forces applied by cables 22 and 24, and to resist certain reverse loads applied to the system by external force on control portion 14, all as explained in detail below. The stated means include a resilient force reaction member of suitable type which may take the form of a cylinder 54 pivotally restrained at its lower end to prevent vertical movement thereof and containing a piston 56 slidably movable with respect to the cylinder and a spring 58 also within cylinder 54. Piston 56 is affixed to connection means such as rod 60 extending from one end of cylinder 54. Rod 60 is pivotally attached to one extremity of lever 26 by a clevis or equivalent means permitting rotation of the stated connection about a pivot axis 62 as shown in the drawing. From the description set forth above, it will be understood that rotation of lever 26 about center 30 in either direction due to force applied by cables 22 or 24 will be resisted by compression spring 58 acting in opposition to the generally upward movement of piston 56 within cylinder 54. Thus, rotational movement of lever 26 in either direction away from the neutral position shown by solid lines in the drawing tends to compress spring 58 by the generally upward movement of piston 56 with the result that the force of spring 58 reacting against the piston is increased for each increment of piston travel upward. The amount of reaction force applied by spring 58 to piston 56 increases in direct proportion to the amount of rotation of lever 26 and affects the cockpit control members in a manner generally similar to the effects of increased air impact forces on elevator 6, thus aiding the pilot in judging the amount of elevator or other control surface displacement in systems wherein such impact forces are not strongly felt at the pilot operated control members. Due to the stated operating characteristics, resilient force reaction means 54–62 described above may be appropriately termed artificial feel means.

The control system disclosed herein also incorporates means whereby the trim force applied by normally stationary portion 12 is augmented by automatic movement of movable control portion 14 in response to angular adjustment of portion 12 by actuator 20. The stated means includes support means in the form of a rigid arm or bracket 64 which may be integrally joined or otherwise affixed to bracket 36 and secured therewith to spar 40 of portion 12 as shown in the drawing. Pivotally secured at one end to bracket 64 for rotation about an axis 66 is a rigid link 68, the opposite end of which is secured to one arm 70 of a bellcrank 72 for rotation about an axis 74. Bellcrank 72 includes another arm 76 and is pivotally mounted on a relatively stationary bracket 78 for rotation about an axis 80. A link 82 is secured to the distal end of arm 76 of bellcrank 72 in a manner permitting rotation about an axis 84. The opposite end of link 82 is pivotally joined to one arm 86 of a bellcrank 88 for rotation about an axis 90. Bellcrank 88 is rotationally mounted on a relatively stationary bracket 92 for movement about an axis 94, and the bellcrank further includes an arm 96, to the distal end of which a bracket 98 on one end of cylinder 54 is pivotally secured for rotation about an axis 100.

Operation

Although the structure disclosed herein may be calibrated or arranged in various ways depending upon the size of installation, magnitude of forces involved, or desired relationship between trim and control forces according to a predetermined program, its operation need not differ materially from the description set forth herein for the sake of illustration. Since operation of movable control portion 14 under the influence of cables 22 and 24, and the system effects of artificial feel means 54–62 are described generally above, no further comment thereon appears necessary. Considering a normal trimming operation as accomplished in the inventive structure shown in the drawing, and assuming that airfoil portions 12 and 14 constitute a horizontal stabilizer and elevator, respectively, the trimming procedure may appropriately begin by operation of actuator 20 to raise or lower the leading edge of the stabilizer by an amount depending upon the force necessary to correct a condition of unbalance in the vehicle to which the illustrated structure is affixed. For example, atuator 20 may lower the leading edge to the position shown by broken lines wherein center plane 44 is positioned as indicated by line 44'. The stated change of leading edge position is accomplished by rotation of portion 12 in its entirety about pivot axis 18, including bracket arms 36 and 64 affixed to spar 40, and further including portion 14 which in the absence of the novel structure disclosed herein would otherwise assume the position wherein center plane 50 moves to the position denoted at 50'. However, it will be seen from the description set forth below that the novel system disclosed herein operates to modify the position of portion 14 in response to rotation of portion 12 about axis 18 whereby portion 14 is rotated about axis 16 whenever portion 12 is rotated about axis 18. Thus, in the stated example of trimming operation the portion 14 moves from the position identified with center line 50 into that identified with line 52'. This results from the fact that rotation of portion 12 in the stated manner whereby its center plane 44 moves to the position indicated at 44' causes counterclockwise rotation of axis 66 about axis 18, causing link 68 to rotate bellcrank 72 clockwise about axis 80 through an arc, the length of which depends upon the size of parts and the amount of angular change between lines 44 and 44' shown in the drawing. The stated rotation of bellcrank 72, through its connection with bellcrank 88 by means of link 82, causes counterclockwise rotation of bellcrank 88. Movement of bellcrank 88 in the stated manner causes movement of pivotal connection 100 between cylinder 54 and bellrank 88 into a new position such as indicated in the drawing by reference numeral 102. Since pivotal connection 62 always tends to align itself on a line between pivots 30 and 100, pivotal onnection 62 will be moved slightly toward the right as seen in the drawing as a result of the displacement of pivotal connection 100 into position 102. The stated movement of pivot 62 will cause counterclockwise rotation of lever 26. The stated rotation of lever 26 is communicated by link 32, bellcrank 34, link 46, and force arm 48 to movable control portion 14, causing counterclockwise rotation of portion 14 whereby center plane 50' thereof moves to the position indicated by reference numeral 52'. With control portion 14 in the stated position of angularity, the aerodynamic effect produced by downward movement of the leading edge of portion 12 is considerably augmented, since positioning of control portion 14 in the attitude denoted by center line 52' deflects airflow upwardly in the same manner that positioning portion 12 in the attitude denoted by center line 44' deflects airflow upwardly. Therefore, the force applied to correct the balance of a vehicle with respect to its aerodynamic center, using the structural arrangement discussed above in connection with the horizontal stabilizer and elevator controls, is greater than that resulting merely from use of the stabilizer alone to apply trimming force.

Due to the operative characteristic of positioning control portion 14 automatically in response to trimming adjustment of portion 12 as discussed above, it will be understood by those skilled in the art that the novel system disclosed in this case permits a given amount of trim force to be produced by less displacement of portion 12 away from aerodynamic neutral position than would otherwise be required. Thus, for example, in the absence of the change in attitude of portion 14 from the position denoted by line 50' to that denoted by line 52', greater downward movement of portion 12 at the leading edge thereof would be necessary to achieve an equivalent amount of force from airflow deflection. Accordingly, the stated movement of portion 14 from positions indicated by lines 50' and 52', respectively, permits shorter stroke requirements in actuator 20. Also, the novel structure disclosed herein results in a markedly lightweight control system for several reasons including the fact that a single reaction force means 54–62 performs the dual functions of providing artificial feel in the normal control system and also positions control portion 14 of airfoil 10 in response to changes in the angular position of portion 12 according to a precise predetermined schedule of movements which need not be linear in their relationship. Thus, the angle lying between lines 50 and 52, or 50' and 52' in the drawing in comparison to the angle defined by lines 44 and 44' may be varied by changing the length of bracket 64 whereby pivot 66 may be situated at any desired distance from pivot axis 18, resulting in greater or less length in the arc traversed by pivot 66 when portion 12 is adjustably rotated about axis 18. The stated arc will in turn affect the amount of movement occurring in link 68, bellcrank 72, link 82, bellcrank 88, rod 60, bellcrank 26 and ultimately in deflection of portion 14.

In consequence of the novel arrangement shown in the drawing and discussed above, the system thus disclosed is particularly well suited in vehicles characterized by widely varying speeds or loads wherein the trim forces associated with each performance condition are provided by means involving relatively slight and therefore rapid angular adjustment of stabilizer portion 12. This feature results in a quicker response of the trim system following operation of trim actuator 20, and in less resultant drag from the adjusted position of portion 12 identified with each amount of applied trim force. The control system thus taught is suited for use in light planes as well as large transport aircraft and in either case permits lighter control forces to be used in cables 22 and 24 to move control portion 14 during landing. An additional advantage of the system disclosed herein is its improved economy of manufacture, since costly and complex hydraulic or other servomechanisms identified with conventional control systems involving continuous or high external loading of movable control surfaces are dispensed with in the structural approach taught in this case. Thus, the component portions of airfoil 10 may be designed so that forces applied by cables 22 and 24 and initiated by manual controls in the cockpit suffice to deflect control portion 14 even during high speed airflow over the surfaces thereof. This may be achieved by providing portion 14 with a shape which will result in the center of pressure distribution on the surface thereof being generally situated close to the hinge line 16 about which the stated portion pivots. The stated arrangement results in a low moment arm whereby relatively lighter forces need be applied to horn 48 to deflect portion 14 against the restraining force exerted by external airflow around portion 14. The structural arrangement represented by the foregoing description would normally result in overcontrol by the pilot at low flying speeds in the absence of artificial feel means whereby the forces manually applied by the pilot to the cockpit controls are resisted in the same apparent way that deflection of airflow by control portion 14 would resist the applied force at the cockpit controls. It is the function of force reaction means 54–62 to provide resistance of the stated type in the manner described above.

While the particular details set forth above and in the drawings are fully capable of attaining the objects and providing the advantages herein stated, the structure and method thus disclosed are merely illustrative and could be modified or varied to produce the same results without departing from the scope of the inventive concept as defined in the appended claims.

I claim.

1. In a system for controlling the direction of movement of a vehicle relative to a fluid medium, a fin mounted externally on said vehicle, said fin having a main portion adjustably rotatable with respect to said vehicle about a first axis and a control portion pivotally mounted on said main portion for pivoting about a second axis, selectively operable means for positioning said main portion by rotation thereof about said first axis to angularly deflect the relative movement of said fluid medium around said fin, a first bellcrank supported on said main portion for rotation about a third axis intermediate the ends of said first bellcrank, control force means including a lever journaled for rotation about a fourth axis intermediate the ends of said lever, said control force means further including a link connected between said first bellcrank and said lever so that rotation of said lever about said fourth axis causes corresponding rotation of said first bellcrank about said third axis, link means connecting said first bellcrank to said control portion of said fin so that rotation of said first bellcrank about said third axis causes pivotal movement of said control portion about said second axis, a rigid arm secured to said main portion, a second bellcrank pivotally mounted on fixed structure in said vehicle for rotation about a fifth axis intermediate the ends of said second bellcrank, a first elongate member pivotally connected at one end to the distal end of said arm and at the other end to one end of said second bellcrank, a third bellcrank pivotally mounted on fixed structure for rotation about a sixth axis intermediate the ends of said third bellcrank, a second elongate member pivotally connected at one end to the end of said second bellcrank opposite from the connection of said second bellcrank with said first elongate member, said second elongate member being pivotally connected at its other end with an end of said third bellcrank, and a longitudinally extendable resiliently biased link pivotally connected at one end to the end of said third bellcrank opposite from the connection of said second elongate member with said third bellcrank, the remaining end of said resiliently biased link being pivotally connected at one extremity of said lever whereby rotation of said lever in either direction about said fourth axis is resisted by said resiliently biased link.

2. In an aircraft: an adjustably movable stabilizer surface, a control surface hingeably mounted on said stabilizer surface, actuator means connected to said stabilizer surface for rotational displacement of said stabilizer surface about an axis to trim said aircraft, pivotal arm means including a pivotal arm mounted on said stabilizer surface for pivotal movement about a center of rotation intermeditae the ends of said pivotal arm, first linkage means connected to said pivotal arm means for pivoting said pivotal arm in response to an input control force, second linkage means connected between said pivotal arm means and said control surface whereby pivotal movement of said pivotal arm causes rotational movement of said control surface relative to said stabilizer surface, and resilient means operatively related to said first linkage means for resisting said pivoting movement of said pivotal arm in response to said input control force.

3. In a system for controlling the direction of movement of a vehicle relative to a fluid medium; a fin mounted externally on said vehicle, said fin having a main portion adjustably rotatable with respect to said vehicle about a first axis and a control portion pivotally mounted on said main portion for pivoting about a second axis, selectively operable means for positioning said main portion by rotation thereof about said first axis to angularly deflect said fluid around said main portion, rockable means supported on said main portion for rotation about a third axis, control force means including a link connected to said rockable means and movable in either of two opposite directions for rotating said rockable means about said third axis in response to a selectively variable input control force applied by said control force means, link means connecting said rockable means to said control portions of said fin so that rotation of said rockable means about said third axis is adapted to cause pivotal movement of said control portion about said second axis, means connected between said main portion and said control force means for rotating said rockable means about said third axis a predetermined amount to cause said pivotal movement of said control portion about said second axis in response to said rotation of said main portion about said first axis and in a direction increasing the angular deflection of said fluid medium around said fin, said rockable means comprising a bell-crank journaled on a bracket secured to said main portion and said third axis lies intermediate the ends of said bellcrank, said control force means comprising a lever journaled for rotation about a fourth axis intermediate the ends thereof, said control force means further comprising a control cable connected at each end of said lever and a link connected between said bellcrank and said lever so that rotation of said lever about said fourth axis in response to control force applied by said cables causes corresponding rotation of said bellcrank about said third axis, and resilient means operatively connected to said lever and applying force to hold said lever in a normally stationary position whereby movement of said lever about said fourth axis away from said neutral position is resiliently resisted.

4. In a system for controlling the direction of movement of a vehicle relative to a fluid medium; a fin mounted externally on said vehicle, said fin having a main portion adjustably rotatable with respect to said vehicle about a first axis and a control portion pivotally mounted on said main portion for pivoting about a second axis, selectively operable means for positioning said main portion by rotation thereof about said first axis to angularly deflect said fluid around said main portion, rockable means supported on said main portion for rotation about a third axis, control force means including a link connected to said rockable means and movable in either of two opposite directions for rotating said rockable means about said third axis in response to a selectively variable input control force applied by said control force means, link means connecting said rockable means to said control portion of said fin so that rotation of said rockable means about said third axis is adapted to cause pivotal movement of said control portion about said second axis, and means connected between said main portion and said control force means for rotating said rockable means about said third axis a predetermined amount to cause said pivotal movement of said control portion about said second axis in response to said rotation of said main portion about said first axis and in a direction increasing the angular deflection of said fluid medium around said fin.

5. The structure set forth in claim 4 above, wherein: said rockable means comprises a bellcrank journaled on a bracket secured to said main portion and said third axis lies intermediate the ends of said bellcrank, said control force means comprises a lever journaled for rotation about a fourth axis intermediate the ends thereof, said control force means further comprising a control cable connected at each end of said lever said link being connected between said bellcrank and said lever so that rotation of said lever about said fourth axis in response to control force applied by said cables causes corresponding rotation of said bellcrank about said third axis.

6. In a system for controlling the direction of movement of a vehicle relative to a fluid medium; a fin mounted externally on said vehicle, said fin having a main portion adjustably rotatable with respect to said vehicle about a first axis and a control portion pivotally mounted on said main portion for pivoting about a second axis, selectively operable means for positioning said main portion by rotation thereof about said first axis, rockable means supported on said main portion for rotation about a third axis, control force means including a link connected to said rockable means and movable in either of two opposite directions for rotating said rockable means about said third axis in response to a selectively variable input control force applied by said control force means, link means connecting said rockable means to said control portion of said fin so that rotation of said rockable means about said third axis causes pivotal movement of said control portion about said second axis, means connected between said main portion and said control force means for rotating said rockable means about said third axis a predetermined amount in response to said positioning rotation of said main portion about said first axis, and said means connected between said main portion and said control force means including resilient force means for resisting movement of said link in either of said directions.

References Cited by the Examiner

UNITED STATES PATENTS

| | | | |
|---|---|---|---|
| 2,094,488 | 9/37 | Gwinn | 244—87 |
| 2,563,757 | 8/51 | Thorp | 244—87 |
| 2,780,427 | 2/57 | Keller et al. | 244—83 |

FERGUS S. MIDDLETON, *Primary Examiner.*

ANDREW H. FARRELL, *Examiner.*